(12) United States Patent
Fourcand

(10) Patent No.: US 8,462,907 B2
(45) Date of Patent: Jun. 11, 2013

(54) METHOD AND APPARATUS TO REDUCE WANDER FOR NETWORK TIMING REFERENCE DISTRIBUTION

(75) Inventor: Serge Francois Fourcand, Fairview, TX (US)

(73) Assignee: Futurewei Technologies, Inc., Plano, TX (US)

( * ) Notice: Subject to any disclaimer, the term of this patent is extended or adjusted under 35 U.S.C. 154(b) by 353 days.

(21) Appl. No.: 12/893,385

(22) Filed: Sep. 29, 2010

(65) Prior Publication Data

US 2011/0110475 A1 May 12, 2011

Related U.S. Application Data

(60) Provisional application No. 61/259,898, filed on Nov. 10, 2009.

(51) Int. Cl.
*H04L 7/00* (2006.01)

(52) U.S. Cl.
USPC ........... 375/356; 375/212; 370/501; 714/110; 710/717

(58) Field of Classification Search
USPC ............... 375/212, 215, 257–259, 354, 356, 375/371, 373, 376; 370/254, 257, 258, 324, 370/492, 501, 503; 714/707, 717; 710/58, 710/61, 62, 110
See application file for complete search history.

(56) References Cited

U.S. PATENT DOCUMENTS

| | | | |
|---|---|---|---|
| 5,146,585 A * | 9/1992 | Smith, III | 713/400 |
| 5,568,078 A | 10/1996 | Lee | |
| 6,278,718 B1 * | 8/2001 | Eschholz | 370/503 |
| 6,782,065 B1 * | 8/2004 | Yamanaka et al. | 375/356 |
| 7,145,920 B2 * | 12/2006 | Kinoshita et al. | 370/503 |
| 8,000,425 B2 * | 8/2011 | Chan et al. | 375/354 |
| 2005/0023179 A1 * | 2/2005 | Albritton | 206/524.8 |
| 2005/0147411 A1 * | 7/2005 | Hamou et al. | 398/59 |
| 2007/0248201 A1 * | 10/2007 | Ker et al. | 375/355 |

FOREIGN PATENT DOCUMENTS

| | | |
|---|---|---|
| EP | 1530382 A1 | 11/2005 |
| WO | 2004099955 A1 | 11/2004 |

OTHER PUBLICATIONS

Foreign Communication From a Related Counterpart Application, PCT Application PCT/CN2010/078491, International Search Report dated Feb. 10, 2011, 3 pages.
Foreign Communication From a Related Counterpart Application, PCT Application PCT/CN2010/078491, Written Opinion dated Feb. 10, 2011, 6 pages.

\* cited by examiner

*Primary Examiner* — Dac Ha
(74) *Attorney, Agent, or Firm* — Conley Rose, P.C.; Grant Rodolph; Rayhao Chung

(57) ABSTRACT

A network component comprising a first adaptation component, a second adaptation component, a system Phase-Locked-Loop (PLL) coupled to the first adaptation component, a comparison and voting logic component coupled to the first adaptation component and the system PLL component, a compensation logic component coupled to the comparison and voting logic component, and a positive/negative delay component coupled to the second adaptation component and the compensation logic component. Also disclosed is a network component comprising a comparison and voting logic function block configured to compare a plurality of internal timing references in a system PLL synchronization area, a compensation logic function block configured to calculate an offset value if any of the internal references substantially deviates from an expected value in a deterministic outcome, and a delay function block configured to add the calculated offset value to a timing reference that is forwarded to a subsequent node.

19 Claims, 5 Drawing Sheets

# METHOD AND APPARATUS TO REDUCE WANDER FOR NETWORK TIMING REFERENCE DISTRIBUTION

CROSS-REFERENCE TO RELATED APPLICATIONS

The present application claims priority to U.S. Provisional Patent Application 61/259,898, filed Nov. 10, 2009 by Serge Fourcand and entitled "Method and Apparatus to Reduce Wander for Network Timing Reference Distribution," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wide area network (WAN) is a computer network that covers a broad geographical area, and generally includes any network whose communications links cross metropolitan, regional, or national boundaries. Typically, WANs cover broader geographical areas than personal area networks (PANs), local area networks (LANs), campus area networks (CANs), or metropolitan area networks (MANs), which are usually limited to a room, building, campus, or specific metropolitan area (e.g. city area), respectively. WANs are used to connect LANs and other types of networks together, so that users and computers in one location can communicate with users and computers in other locations. Many WANs are built for one particular organization and are private. Other WANs are built by Internet service providers and provide connections from an organization's LAN to the Internet. WANs are usually built using leased lines and routers or circuit/packet switching architectures and implement a plurality of network protocols, including Synchronous Optical Networking (SONET) and Synchronous Digital Hierarchy (SDH).

SONET and SDH are standardized multiplexing protocols that transfer multiple digital bit streams over optical fibers or electrical interfaces. Due to SONET/SDH protocol neutrality and transport-oriented features, SONET/SDH is used for transporting substantially large amounts of telephone calls and data traffic over the same fiber or wire without synchronization problems. SONET/SDH network transmission standards are based on time division multiplexing (TDM). TDM is a technology where two or more signals or bit streams are apparently transferred simultaneously as sub-channels in one communication channel but physically take turns on the channel. This is achieved by dividing the time domain into a plurality of recurrent timeslots, e.g. of about same length, one for each sub-channel. As such, one TDM frame corresponds to one timeslot per sub-channel.

SUMMARY

In one aspect, the disclosure includes a network component comprising a first adaptation component, a second adaptation component, a system Phase-Locked-Loop (PLL) coupled to the first adaptation component, a comparison and voting logic component coupled to the first adaptation component and the system PLL component, a compensation logic component coupled to the comparison and voting logic component, and a positive/negative delay component coupled to the second adaptation component and the compensation logic component.

In another aspect, the disclosure includes a network component comprising a comparison and voting logic function block configured to compare a plurality of internal timing references in a system PLL synchronization area, a compensation logic function block configured to calculate an offset value if any of the internal references substantially deviates from an expected value in a deterministic outcome, and a delay function block configured to add the calculated offset value to a timing reference that is forwarded to a subsequent node.

In a third aspect, the disclosure includes a method comprising receiving a plurality of internal timing references in a repeater node that forwards a timing reference along a distribution path, calculating an offset value if any of the received internal timing references substantially deviates from an expected value based on the amount of deviation, and adding the offset value to the timing reference that is forwarded by the repeater node to compensate for added noise in the timing reference.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Typically, a plurality of geographically distributed network nodes, e.g. in a WAN, may be synchronized for transmissions by forwarding a plurality of clock/timing reference signals to the nodes. The timing reference signals may be used to synchronize the nodes' clocks and support the nodes' operations and transmissions at a single frequency domain, for instance using TDM. The timing reference signals may be distributed to the nodes from a single point or node, such as in a star pattern. However, such a star distribution pattern may require the deployment, operation, and maintenance of a clock/timing reference distribution network in addition to the node's transport network that transports bearer traffic, which may increase burden and cost. Alternatively, to avoid using multiple network infrastructures, the timing reference signals may be distributed using the node's transport network by forwarding the timing reference signals between the nodes in a cascaded manner, such as along distribution paths. Accordingly, the timing reference signals may be forwarded at each hop along a distribution path from a network node that acts as a repeater to a subsequent network node until the timing reference signals arrive to the destination nodes. This cascaded timing reference distribution scheme may cause the timing reference signals to be dependent on the clock characteristics in the nodes that act as repeaters, which may add error or noise to the forwarded timing reference signals and cause the nodes' clock time to wander.

Figure 1:
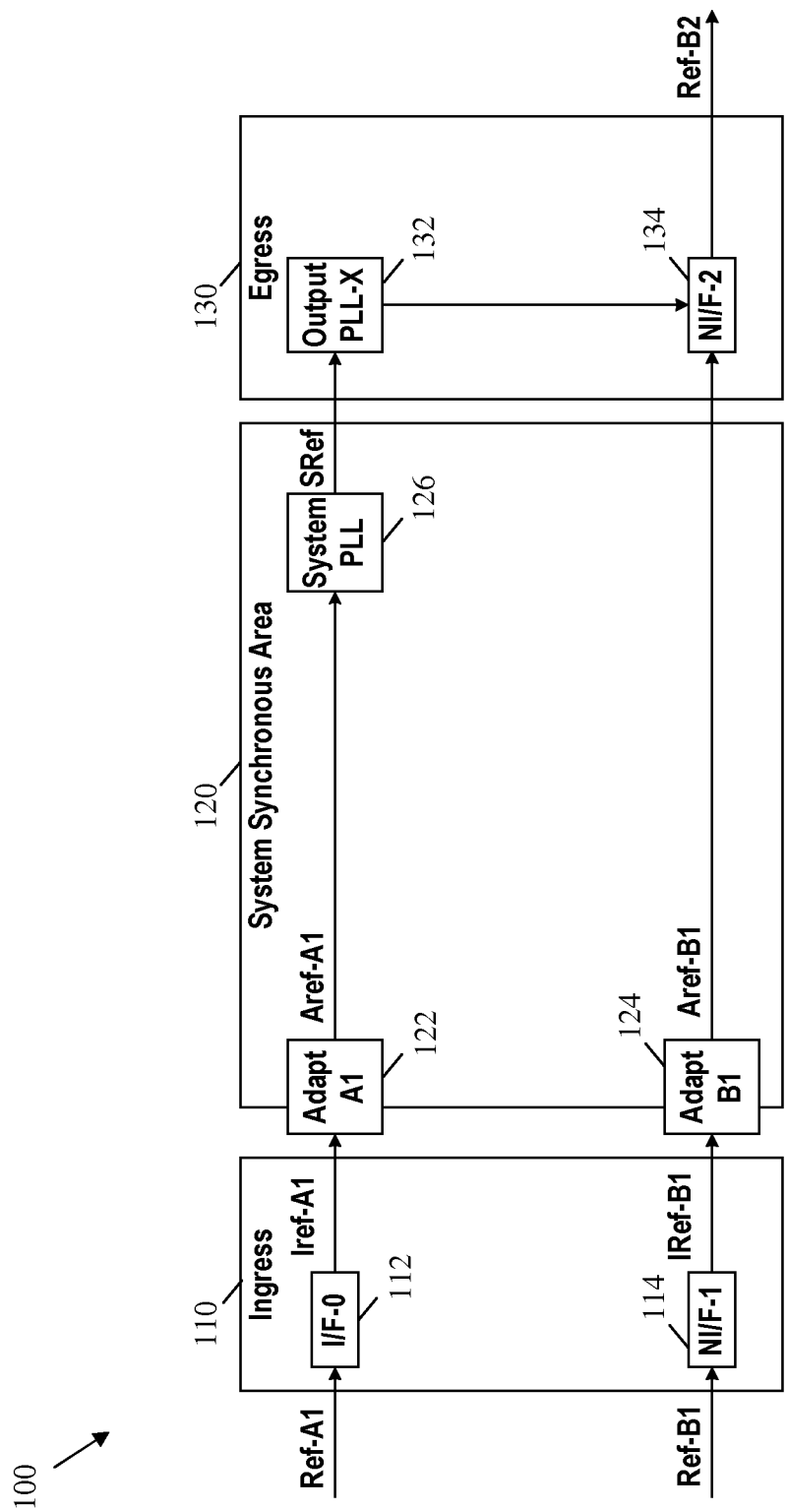
FIG. 1 is a schematic diagram of an embodiment of a timing reference forwarding node.

FIG. 1 illustrates an embodiment of a typical timing reference forwarding node 100, which may be used in current or existing networks, such as WANs or TDM based networks. The timing reference forwarding node 100 may act as a repeater that forwards timing reference signals in a cascaded scheme along a distribution path. For instance, the timing reference forwarding node 100 may use a first timing reference to calculate or update the node's internal clock timing and forward the same or a second timing reference signal to a subsequent node along the distribution path to synchronize the subsequent node's clock timing. The timing reference forwarding node 100 may comprise an ingress 110, a system synchronous area 120 coupled to the ingress 110, and an egress 130 coupled to the system synchronous area 120.

The ingress 110 may comprise one or a plurality of ingress ports that receive timing reference signals. The ingress 110 may receive a first timing reference, e.g. Ref-A1, for the timing reference forwarding node 100 and a second timing reference, e.g. Ref-B1, for a subsequent node (not shown) along the distribution path. The timing references Ref-A1 and Ref-B1 may be received from another node on the distribution path (e.g. an upstream node), which may also act as a repeater similar to the timing reference forwarding node 100. The timing references Ref-A1 and Ref-B1 may correspond to the same signal or to different signals and may be received at a single ingress port or separate ingress ports. The ingress 110 may comprise a first ingress function 112, e.g. I/F-0, that receives Ref-A1 and a second ingress function 114, e.g. NI/F-1, that receives Ref-B1. The first ingress function 112 and the second ingress function 114 may be implemented using hardware, software, or both. The first ingress function 112 and the second ingress function 114 may then forward an instance or copy of Ref-A1 and Ref-B1, e.g. IRef-A1 and IRef-B1, to the system synchronous area 120, respectively.

The system synchronous area 120 may comprise a plurality of components that correspond to the node's system PLL and operate at a clock domain. The system synchronous area 120 may comprise a first adaptation function 122, e.g. Adapt A1, a second adaptation function 124, e.g. Adapt B1, and a system PLL function 126 coupled to the first adaptation function 122, e.g. System PLL, all of which may be implemented using hardware, software, or both. The first adaptation function 122, the second adaptation function 124, and the system PLL function 126 may receive IRef-A1 and IRef-B1 from the ingress 110, use IRef-A1 to calculate or update the node's internal clock timing, and forward a timing reference corresponding to IRef-B1 to the egress 130.

The first adaptation function 122 may be a frequency domain adaptation function that receives IRef-A1 from the first ingress function 112 and converts IRef-A1 from an ingress frequency domain into an equivalent timing reference, e.g. ARef-A1, in the system synchronous PLL frequency domain. The first adaptation function 122 may then forward ARef-A1 to the system PLL function 126. The system PLL function 126 may receive ARef-A1 from the first adaptation function 122, use ARef-A1 to calculate or update the node's internal clock timing, and then forward an updated timing reference, e.g. SRef, to the egress 130. Similar to the first adaptation function 122, the second adaptation function 124 receives IRef-B1 from the second ingress function 114 and converts IRef-B1 from the ingress frequency domain into an equivalent timing reference, e.g. ARef-B1, in the system PLL frequency domain. The second adaptation function 124 may then forward ARef-B1 to the egress 130.

The egress 130 may comprise one or a plurality of egress ports that forward timing reference signals. The egress 130 may comprise an output PLL function 132, e.g. Output PLL-X, and an egress function 134, e.g. NI/F-2, which may forward a corrected timing reference that corresponds to ARef-B1 based on the updated node's internal clock timing SRef. Specifically, the output PLL function 132 may receive SRef from the system PLL function 126 and provide SRef to the egress function 134. The egress function 134 may receive ARef-B1 from the second adaptation function 124, receive SRef from the output PLL function 132, and correct ARef-B1 based on SRef. The egress function 134 may then forward a corrected timing reference, e.g. Ref-B2, to a subsequent node on the distribution path. Updating or correcting the subsequent node's timing reference based on SRef may provide clock time synchronization between the timing reference forwarding node 100 and the subsequent node, and thus provide transmissions synchronization between the two nodes.

However, the corrected timing reference Ref-B2 that is forwarded to the subsequent node may comprise errors due to internal noise in the preceding nodes along the distribution path, such as Gaussian noise. For example, the first adaptation function 122 may introduce or add noise to IRef-A1 during the transitioning from the ingress frequency domain to the system PLL frequency domain, e.g. due to computational limitations. Similarly, the second adaptation function 114 may introduce noise to IRef-B1. Further, the system PLL function 126 and the output PLL function 132 may each introduce noise to their corresponding outputs, e.g. due to an intrinsic built-in response latency to changes occurring on their input timing references. Additionally, the received timing references Ref-A1 and/or Ref-B1 at the ingress 110 and/or the forwarded timing reference Ref-B2 at the egress 130 may comprise external noise or error, e.g. Gaussian noise, due to transport between the nodes along the distribution path.

In a cascaded timing reference distribution scheme, such as implemented by the timing reference forwarding node 100, the timing references may accumulate Gaussian noise (internal and/or external) in an additive manner as the signals are forwarded along the distribution path. For instance, the accumulated noise in a timing reference signal may be equivalent to about the sum of the Gaussian noise introduced at each encountered noise source, e.g. any of the components above. The resulting error in the timing reference, for example due to accumulated Gaussian noise, may cause a wander or offset (e.g. negative or positive) in the timing reference from a correct or desired clock time value and therefore degrade the accuracy of the timing reference. The wander in the timing reference may increase as the timing reference is forwarded by more components or nodes and may, at some point, exceed a threshold or a defined limit that corresponds to a pre-determined clock accuracy, e.g. as defined by an industry standard.

In some systems, the quantity of nodes that may be used to forward the timing reference signal along the distribution path may be restricted to prevent the increase in timing reference wander beyond a defined limit, e.g. to maintain a pre-determined clock accuracy. In some cases, a new or non-degraded timing reference may be retransmitted, e.g. periodically, along the distribution path to reduce the timing reference degradation. Additionally or alternatively, the forwarded timing reference may not be used to synchronize some of the node clocks that require relatively high timing reference accuracy. Such schemes may reduce timing reference usefulness and/or increase system cost.

Disclosed herein are systems and methods for improving timing reference accuracy in a network. The systems and methods may comprise distributing a plurality of timing references between a plurality of nodes along a distribution path and synchronizing the nodes' clocks to compensate for various noise sources, e.g. for Gaussian noise, that degrade the accuracy of the timing references. By doing so, the wander and degradation in the timing reference may be reduced. The noise may be compensated by comparing a plurality of internal timing references in a forwarding node or repeater in the distribution path and accordingly calculating a correction value to reduce a predicted offset in the timing reference from a desired clock time value. As such, the quantity of nodes that may forward the timing references along the distribution path may be increased, the frequency of retransmitting the timing references along the distribution path may be decreased, or both, which may improve timing reference and clock synchronization accuracy.

Figure 2:
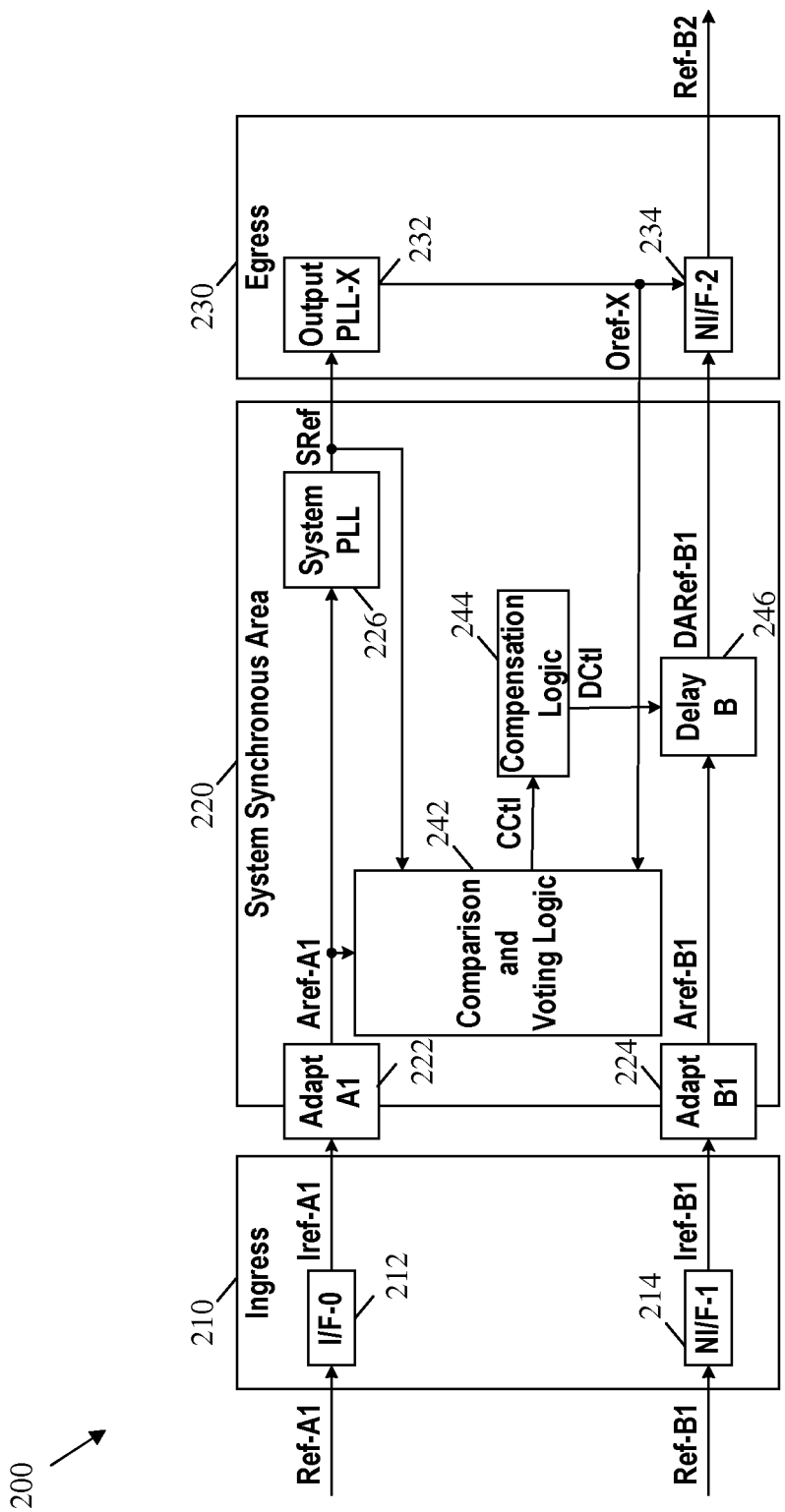
FIG. 2 is a schematic diagram of another embodiment of a timing reference forwarding node.

FIG. 2 illustrates an embodiment of a timing reference forwarding node 200, which may compensate for noise, e.g. Gaussian noise, that may be introduced by some of the node's components. Similar to the node 100, the timing reference forwarding node 200 may act as a repeater that forwards timing reference signals in a cascaded scheme along a distribution path. The timing reference forwarding node 200 may comprise an ingress 210, a system synchronous area 220 coupled to the ingress 210, and an egress 230 coupled to the system synchronous area 220. The components of the ingress 210, the system synchronous area 220, and the egress 230 may be coupled to each other as shown in FIG. 2.

The ingress 210 may comprise a first ingress function 212, e.g. I/F-0, and a second ingress function 214, e.g. NI/F-1, which may be configured substantially similar to the corresponding components of the ingress 110. As such, the first ingress function 212 and the second ingress function 214 may receive the timing references Ref-A1 and Ref-B2, respectively, e.g. from another node in the distribution path, and send their corresponding timing references IRef-A1 and IRef-B2 to the system synchronous area 220.

The system synchronous area 220 may comprise a first adaptation function 222, e.g. Adapt A1, a second adaptation function 224, e.g. Adapt B1, and a system PLL function 226, e.g. System PLL, which may be configured substantially similar to the corresponding components of the system synchronous area 120. As such, the first adaptation function 222 may receive IRef-A1 from the first ingress function 212 in the ingress frequency domain and send ARef-A1 to the system PLL function 226 in the system PLL frequency domain. The system PLL function 226 may receive ARef-A1 and send the updated timing reference SRef to the egress 230. The second adaptation function 224 may receive IRef-B1 from the second ingress function 214 in the ingress frequency domain and provide the output ARef-B1 in the system PLL frequency domain.

Additionally, the system synchronous area 220 may comprise a comparison and voting logic function 242 that may be coupled to the output of the first adaptation function adaptation function 222, the system PLL function 226, and/or an output PLL function 232, e.g. Output PLL-X, in the egress 230. The system synchronous area 220 may also comprise a compensation logic function 244 coupled to the output of the comparison and voting logic function 242, and a delay function 246, e.g. Delay B, coupled to the output of the second adaptation function 224 and the compensation logic function 244. The comparison and voting logic function 242, the compensation logic function 244, and the delay function 246 may be implemented using hardware, software, or both and may be configured to compare a plurality of internal timing references and accordingly introduce or add, e.g. if needed, an offset to the forwarded timing reference to compensate for any predicted degradation or wander in the timing reference.

For instance, in existing network nodes similar to the node 100, the timing reference Ref-B2 at the output of the egress function 134 may comprise additional noise in comparison to the corresponding input ARef-B1, which may also comprise more noise in comparison to the input of the second adaptation function 124, IRef-B1 or Ref-B1. The noise in Ref-B2 may also depend on the output of the output PLL function 132, which may depend on the output SRef of the system PLL 126 and the output ARef-A1 of the first adaptation function 122. To compensate for at least some of the internal noise in the timing reference forwarding node 200, the output of the system PLL 226 and/or the output of the output PLL function 232 may be used to add an offset value to Ref-B2 and thus compensate for at least some of the noise in Ref-B2.

Specifically, the comparison and voting logic function 242 may receive the timing reference ARef-A1 from the first adaptation function 222, timing reference SRef from the system PLL 226, and a corresponding timing reference, e.g. ORef-X, from the output PLL function 232. The comparison and voting logic function 242 may then compare each of the received timing references to a corresponding previously stored value. For instance, each of ARef-A1, SRef, and ORef-X may be compared to a corresponding last received and stored value or to a corresponding average of a plurality of last received and stored values. The comparison and voting logic function 242 may compare the newly or currently received timing references to the corresponding stored values to determine whether any of the received timing references substantially deviates from a stored or expected value. For instance, the difference between the new received value and the stored value for each of the received timing references may be compared to a corresponding standard deviation value that may also be calculated and stored. In some embodiments, the average and/or standard deviation of the stored values for each of ARef-A1, SRef, and ORef-X may also be updated using the newly received timing references, e.g. before or after the comparison process.

The different possible outcomes of the comparison process may be summarized in Table 1 below. Each row in the table shows one possible outcome of the comparison process for each of ARef-A1, SRef, and ORef-X. Since there are about three values to consider, there may be about eight possible outcomes of the comparison process. In the Table 1, the symbol "o" indicates that a timing reference has substantially deviated from its expected value and the symbol "x" indicates that the timing reference did not substantially deviate for its expected value.

TABLE 1

Possible outcomes of the comparison process
of the comparison and voting logic function.

| ARef-A1 | SRef | ORef-X |
|---|---|---|
| x | x | x |
| x | x | o |
| x | o | x |
| x | o | o |
| o | x | x |
| o | x | o |
| o | o | x |
| o | o | o |

As shown in Table 1, about four of the eight possible outcomes may be deterministic, e.g. where only a single timing reference, if any, that substantially deviates from the expected value is detected. Accordingly, about 50 percent of all the possible outcomes may be deterministic. The deterministic possible outcomes include the first row where none of the timing references substantially deviates from a corresponding expected value, the second row where only ORef-X substantially deviates from its expected value, the third row where only SRef substantially deviates from its expected value, and the fifth row where only ARef-1 substantially deviates from its expected value.

The comparison and voting logic function 242 may send the outcome of the comparison process to the compensation logic function 244, e.g. in a control signal (CCtl). The compensation logic function 244 may then determine whether the received outcome of the comparison process is a deterministic outcome. If the outcome is deterministic, the comparison and voting logic function 242 may use the information in the deterministic outcome, such as which timing reference, if any, substantially deviates from its expected value and/or the amount of the deviation, to calculate an appropriate offset value for the timing reference. The calculated offset value may be about equal or proportional to the amount of deviation. The comparison and voting logic function 242 may then send the calculated offset value, e.g. DCtl, to the delay function 246, which may then add the offset value to ARef-B1 from the second adaptation function 224 to pre-compensate for the potential degradation expected in Ref-B2 at the output of the timing reference forwarding node 200. The delay function 246 may add the offset value to ARef-B1 to obtain a delayed timing reference, e.g. DARef-B1, and send DARef-B1 to an egress function 234, e.g. NI/F-2, in the egress 230. Alternatively, if the outcome received at the compensation logic function 244 is not deterministic, then the comparison and voting logic function 242 and the delay function 246 may not calculate and add an offset value to Ref-B1, since Ref-B2 may not be expected to comprise substantial noise or have substantial degradation. In this case, the timing reference DARef-B1 sent to the egress function 234 may not comprise an added offset value.

The egress 230 may comprise the output PLL function 232 and the egress function 234, which may be configured similar to the corresponding components of the egress 130. As such, the output PLL function 232 may receive SRef from the system PLL function 226 and provide the corresponding output ORef-X to the egress function 234. The egress function 234 may receive ORef-X from the output PLL function 232, receive DARef-B1 from the delay function 246, and correct DARef-B1 based on ORef-X. The egress function 234 may then forward the corrected timing reference Ref-B2 to a subsequent node on the distribution path, which may comprise the added offset value to compensate for any internal noise in the output signal. Since about 50 percent of the possible outcomes of the comparison process in the system synchronization area 220 may be deterministic and used to compensate for internal noise in Ref-B2, the internal noise compensation scheme above may reduce internal noise in Ref-B2 about 50 percent of the time.

Figure 3:
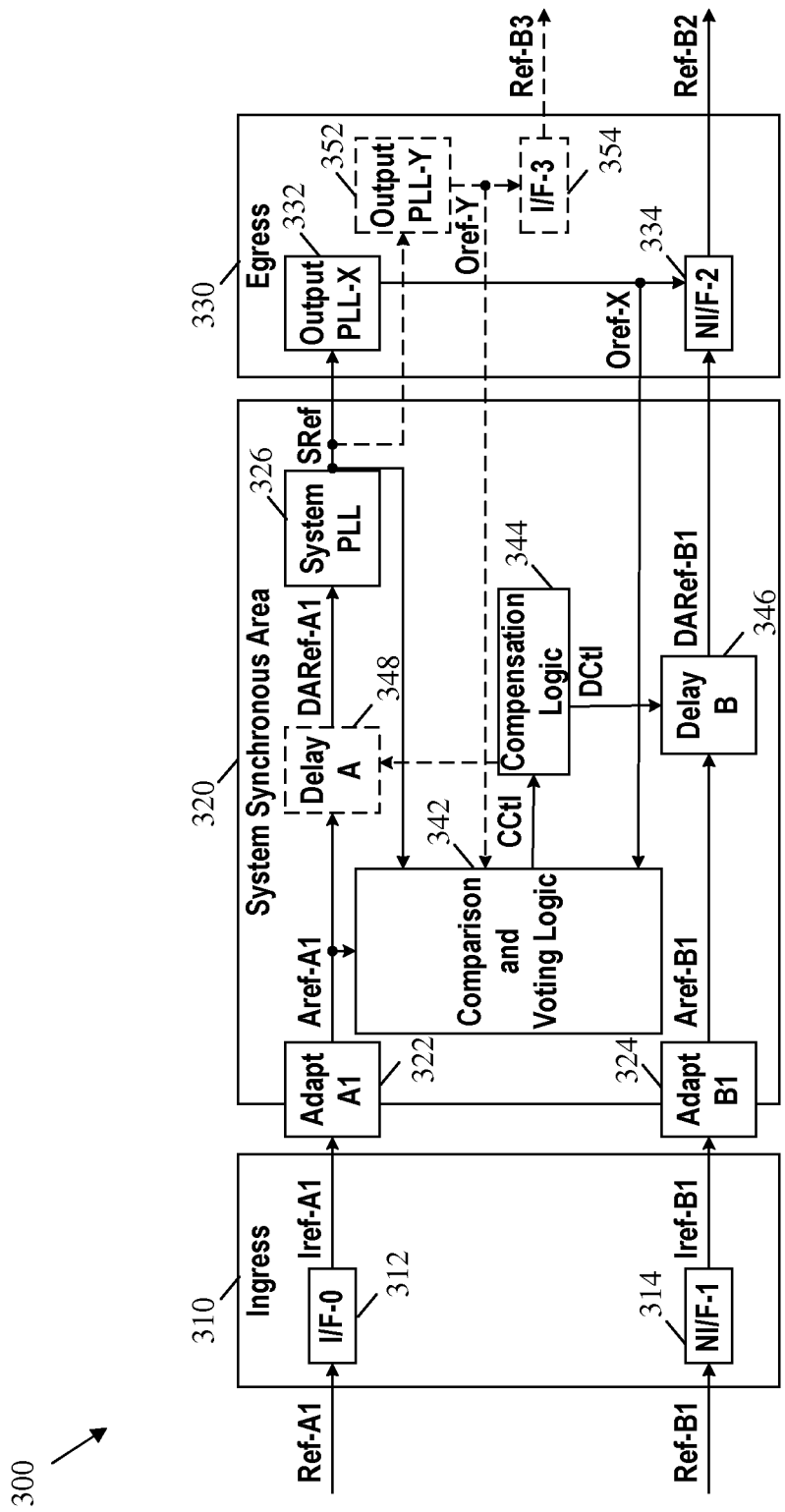
FIG. 3 is a schematic diagram of another embodiment of a timing reference forwarding node.

FIG. 3 illustrates another embodiment of a timing reference forwarding node 300, which may implement an internal noise compensation scheme. Similar to the node 100, the timing reference forwarding node 300 may act as a repeater that forwards timing reference signals in a cascaded scheme along a distribution path. The timing reference forwarding node 300 may comprise an ingress 310, a system synchronous area 320 coupled to the ingress 310, and an egress 330 coupled to the system synchronous area 320.

The ingress 310 may comprise a first ingress function 312, e.g. I/F-0, and a second ingress function 314, e.g. NI/F-1, which may be configured substantially similar to the corresponding components of the ingress 110. The system synchronous area 320 may comprise a first adaptation function 322, e.g. Adapt A1, a second adaptation function 324, e.g. Adapt B1, a system PLL function 326, e.g. System PLL, a comparison and voting logic function 342, a compensation logic function 344, and a delay function 346, e.g. Delay B, which may be configured similar to the corresponding components of the system synchronous area 220. The egress 330 may comprise an output PLL function 332, e.g. Output PLL-X, and an egress function 334, e.g. NI/F-2, which may be configured similar to the corresponding components of the egress 230.

Additionally, the system synchronization area 320 may comprise a second delay function 348, e.g. Delay A, positioned between the first adaptation function 322 and the system PLL function 326 and coupled to an output of the compensation logic function 344. The egress 330 may also comprise a second output PLL function 352, e.g. Output PLL-Y, coupled to the system PLL 326 and a second egress function 354, e.g. I/F-3, coupled to the second output PLL function 352. The comparison and voltage logic function 342 of the system synchronization area 320 may also be coupled to the second output PLL function 352. The components of the ingress 310, the system synchronization area 320, and the egress 330 may be implemented using hardware, software, or both and may be arranged as shown in FIG. 3.

Similar to the components of the system synchronization area 220, the comparison and voting logic function 342, the compensation logic function 344, and the delay function 346 may compare a plurality of internal timing references and accordingly introduce or add, e.g. if needed, an offset to the forwarded timing reference to compensate for any predicted degradation or wander in the timing reference. As such, the comparison and voting logic function 342 may receive the timing references ARef-A1 from the first adaptation function 322, SRef from the system PLL 326, and ORef-X from the output PLL function 332 and compare each of the received timing references to a corresponding previously stored value.

Additionally, the comparison and voting logic function 342 may also receive a timing reference that corresponds to SRef, e.g. ORef-Y, from the second output PLL function 352 and compare ORef-Y to a corresponding previously stored value. The comparison and voting logic function 342 may then send the outcome of the comparison process for each of the timing references ARef-A1, SRef, ORef-X, and/or ORef-Y to the compensation logic function 344. The compensation logic function 344 may determine whether the received outcome of the comparison process is a deterministic outcome and accordingly send a calculated offset value to the delay function 346, which may then add the offset value to ARef-B1 from the second adaptation function 324 to pre-compensate for the potential degradation expected in Ref-B2 at the output of the first egress function 334. Similarly, the compensation logic function 344 may also send a second calculated offset value to the second delay function 348, which may be configured to add the second offset value to ARef-A1 from the first adaptation function 322 to pre-compensate for the potential degradation expected in a second forwarded timing reference, e.g. Ref-B3, at the output of the second egress function 354. Specifically, the delay function 346 may add the offset value to ARef-A1 to obtain a corresponding delayed timing reference, e.g. DARef-A1, and send DARef-A1 to the second egress function 354.

In the egress 330, the second output PLL function 352 may be configured to receive SRef from the system PLL function 326 and provide the corresponding timing reference ORef-Y to the second egress function 354 and to the comparison and voting logic function 342. The second egress function 354 may be configured to receive ORef-X from the second output PLL function 352 and then forward the second forwarded timing reference Ref-B3 to a subsequent node on the distribution path. As such, the subsequent node may receive and use both Ref-B2 and Ref-B3 to synchronize its clock time. Using the internal noise compensation scheme described above, both Ref-B2 and Ref-B3 may comprise added offset values to compensate for any internal noise in the output signal. The subsequent node may use the two forwarded timing references, Ref-B2 and Ref-B3, instead of a single timing reference, e.g. Ref-B2, to improve its clock synchronization accuracy.

As described above, the internal noise compensation scheme in the node 200 or the node 300 may use the egress PLLs, e.g. the output(s) of the egress function 234 or 334 and/or the second egress function 354, in a feedback loop to provide a multi-input decision matrix within the node's components, e.g. stored in any of in the components of the system synchronization area 220 or 320. In other embodiments, the node 200 or 300 may comprise additional functions in the system synchronization area 220 or 320, the egress 230 or 330, or both to provide more forwarded timing references, e.g. more than two timing references, to a subsequent node in the distribution path, and thus further increase the subsequent node's clock synchronization accuracy. The forwarded timing references may also comprise offset values that may be added to correct or compensate for any added internal noise. The ingress 210 or 310 may also comprise more functions to receive more timing references, e.g. more than two timing references. The additional functions of the node 200 or 300, for example in comparison to the node 100, may be implemented using available components (e.g. hardware, processors, cards, and/or integrated circuits) in currently deployed nodes, such as the node 100. Therefore, adding the additional functions and using the internal noise compensation scheme may not substantially modify or add to existing node and system architectures.

The internal noise compensation scheme above may be implemented in TDM based networks or in packet-based networks. For instance, in packet based networks, the adaptation functions or components in the system synchronous area may convert a plurality of received timestamp packets and/or line timing. In one scenario, the internal noise compensation scheme above may be implemented in legacy WANs, where the degradation of a timing reference that is propagated from a core to an edge of the WAN was previously tolerated. Various levels of timing references and clock quality were defined to support such WAN architectures. For example, in the American National Standards Institute (ANSI) standards, clock quality levels that range from Stratum I to Stratum IV, e.g. in the order from highest to lowest, were defined. With the expanding development and deployment of mobile/cellular services, substantially high accuracy clocks may be needed to support various embedded functions of the mobile/cellular services, such as cellular hand-off. Therefore, some of the previously allowed degradation levels in the propagated timing references may not be tolerated anymore. For instance, cellular based stations typically require a Stratum II quality timing reference, e.g. at +/−16 parts per billion (ppb), to meet a standard +/−50 ppb air interface stability requirement. Thus, a Stratum II level quality clock may have to be maintained more frequently through the WAN to support the cellular base stations located at the edge of the network. Accordingly, the internal noise compensation scheme may be used to provide a timing reference at an output PLL function, e.g. the output function 234, 334, and/or 354, that meets higher quality level requirements, for example to meet the Stratum II level quality clock.

Figure 4:
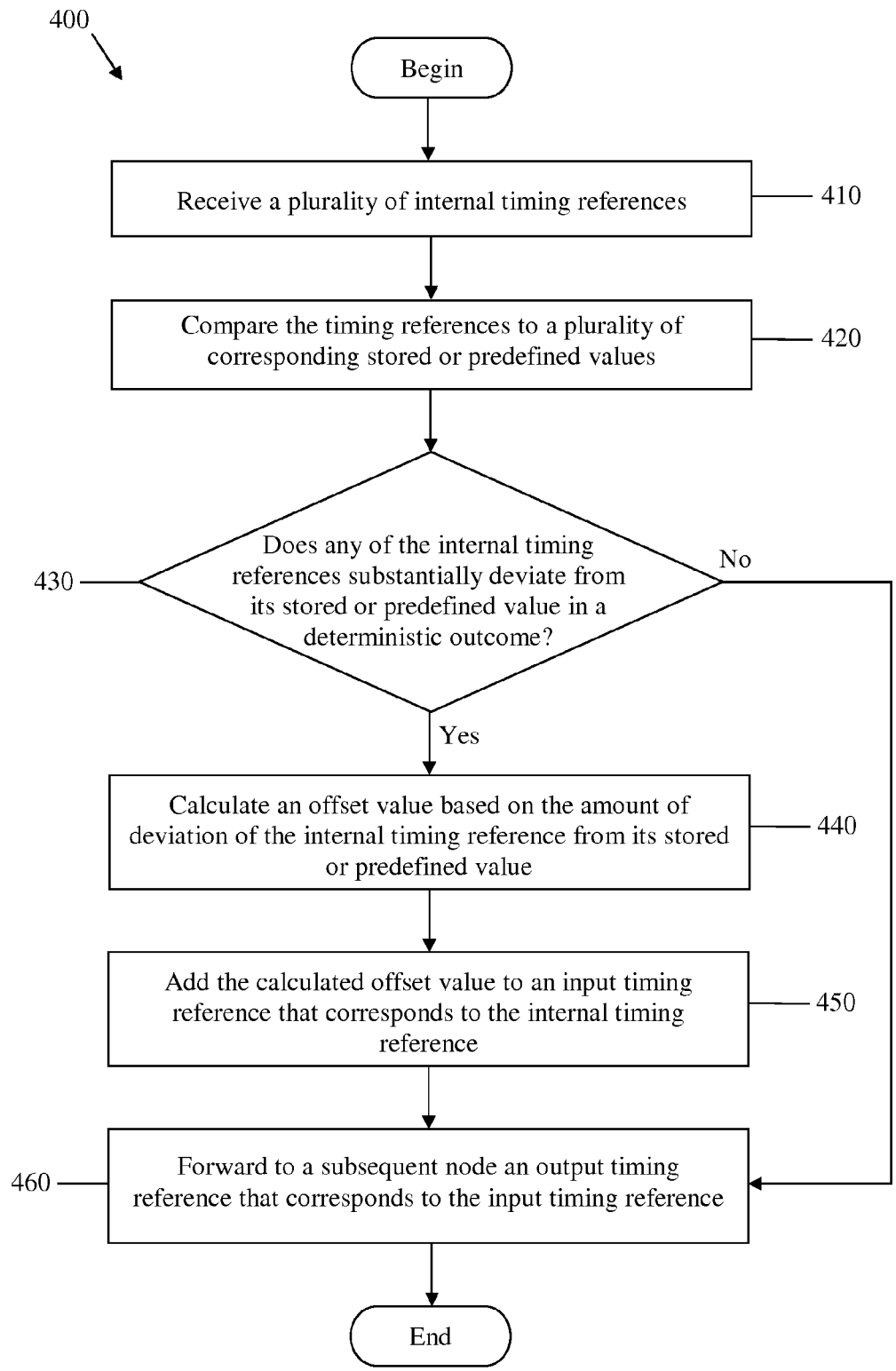
FIG. 4 is a flowchart of an embodiment of an internal noise compensation method.

FIG. 4 illustrates one embodiment of an internal noise compensation method 400, which may be implemented at the node 200 or the node 300. The method 400 may begin at block 410, where a plurality of internal timing references may be received. For instance, the comparison and voting logic function 242 or 342 may receive ARef-A1, SRef, ORef-X, and/or ORef-Y. At block 420, the internal timing references may be compared to a plurality of corresponding stored or predefined fixed values. For instance, the comparison and voting logic function 242 or 342 may compare each of the received timing references to the last corresponding received and stored value, an average of the last corresponding received and stored values, or a pre-defined value.

At block 430, the method 400 may determine whether any of the internal timing references substantially deviates from its stored or predefined fixed value in a deterministic outcome. For instance, the comparison and voting logic function 242 or 342 may compare the difference between each received timing reference value and the corresponding stored or predefined value to a standard deviation value, which may be calculated or predefined, to determine whether the difference exceeds the standard deviation value. If the condition in block 430 is satisfied, then the method 400 may proceed to block 440. Otherwise, the method 400 may proceed to block 460.

At block 440, an offset value may be calculated based on the amount of deviation of the internal timing reference from its stored or a predefined value. For instance, the compensation logic function 244 or 344 may calculate an offset value that may be proportional or about equal to the difference between the timing reference value and the corresponding stored or predefined value. Specifically, the compensation logic function 244 or 344 may determine whether the received outcome of the comparison process in the comparison and voting logic function 242 or 342 is a deterministic outcome. If the outcome is deterministic, then the comparison and voting logic function 242 or 342 may calculate the offset value for the timing reference that substantially deviates from its stored or predefined value.

At block 450, the calculated offset value may be added to an input timing reference that corresponds to the internal timing reference. For instance, the delay function 246 or 346 may add the calculated offset value to ARef-B1 or ARef-A1, which corresponds to ARef-A1, SRef, ORef-X, and/or ORef-Y. At block 460, an output timing reference that corresponds to the input timing reference may be forwarded to a subsequent node. For instance, the egress function 234 or 334 and/or the second egress function 354 may send Ref-B2 and/or Ref-B3, respectively, to the subsequent node on the distribution path. As such, the forwarded output timing reference may comprise the added offset value in the case of a substantial deviation in any of the internal timing references, which may compensate from any resulting degradation in the forwarded timing reference. Alternatively, the forwarded output timing reference may not comprise any added offset value if none of the internal timing references substantially deviates from a stored or predefined value in a deterministic outcome. The method 400 may then end.

Figure 5:
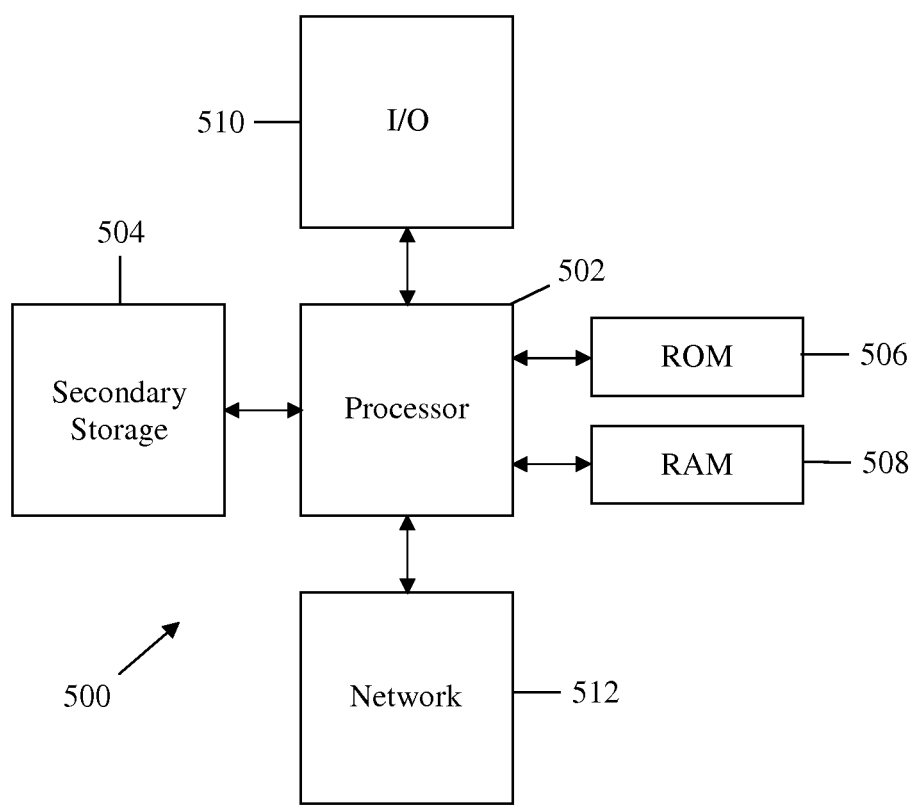
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a first adaptation component comprising a first input for a first internal timing reference;
a second adaptation component comprising a second input for a second internal timing reference;
a system Phase-Locked-Loop (PLL) coupled to the first adaptation component;
a comparison and voting logic component coupled to the first adaptation component and the system PLL component;
a compensation logic component coupled to the comparison and voting logic component;
a positive/negative delay component coupled to the second adaptation component and the compensation logic component;
a first ingress component coupled to the first adaptation component;
a second ingress component coupled to the second adaptation component;
an output PLL component coupled to the system PLL component; and
an egress component coupled to the positive/negative delay component and the output PLL component,
wherein the comparison and voting logic comprises a memory for storing a plurality of predefined timing reference values.

2. The network component of claim 1, wherein the first adaptation component is positioned between the first ingress component and the system PLL component, the system PLL component is positioned between the first adaptation component and the output PLL component, the output PLL component is positioned between the system PLL component and the egress component, the comparison and voting logic component is positioned between the first adaptation component and the compensation logic component, the compensation logic component is positioned between the comparison and voting logic component and the positive/negative delay component, the second adaptation component is positioned between the second ingress component and the positive/negative delay component, and the positive/negative delay component is positioned between the second adaptation component and the egress component.

3. The network component of claim 1, wherein the comparison and voting logic component comprises an input for a third internal timing reference from the first adaptation component, an input for a fourth internal timing reference from the system PLL component, and an input for a fifth internal timing reference from the output PLL component, and wherein the compensation logic component comprises an input for a comparison outcome of any of the internal timing references from the comparison and voting logic component.

4. The network component of claim 3, wherein the positive/negative delay component comprises an input for an offset value from the compensation logic component and an input for a timing reference forwarded to a subsequent node from the second adaptation component, and wherein the egress component comprises an input for a delayed timing reference forwarded to the subsequent node from the positive/negative delay component.

5. The network component of claim 1 further comprising:
a second positive/negative delay component positioned between the first adaptation component and the system PLL component and coupled to the compensation logic component;
a second output PLL component coupled to the system PLL component and the comparison and voting logic component; and
a second egress component coupled to the second output PLL component.

6. The network component of claim 5, wherein the comparison and voting logic component further comprises an input for a third internal timing reference from the first output PLL component.

7. The network component of claim 6, wherein the second positive/negative delay component further comprises an input for a second offset value from the compensation logic component and an input for a second timing reference forwarded to the subsequent node from the second adaptation component, and wherein the second egress component comprises an input for a second delayed timing reference forwarded to the subsequent node from the second positive/negative delay component.

8. A network component comprising:
a comparison and voting logic function block configured to:
receive a plurality of internal timing reference;
store a plurality of predefined timing reference values;
compare the plurality of internal timing references to the plurality of predefined timing reference values; and
determine whether any of the internal timing references substantially deviate from the corresponding predefined timing reference values;
a compensation logic function block configured to calculate an offset value if any of the internal references substantially deviates from an expected value in a deterministic outcome; and
a delay function block configured to add the calculated offset value to a timing reference that is forwarded to a subsequent node.

9. The network component of claim 8, wherein the comparison and voting logic function block, the compensation logic function block, and the delay function block implement a feedback loop that provides a multi-input decision matrix.

10. The network component of claim 8, wherein the internal timing references comprise a first timing reference from a first adaptation function, a first corresponding timing reference from a system Phase-Locked-Loop (PLL) function, and a second corresponding timing reference from an output PLL function.

11. The network component of claim 10, wherein the internal timing references further comprise a third corresponding timing reference from a second output PLL function.

12. The network component of claim 8, wherein the compensation logic function block calculates an offset value if one of the internal timing references substantially deviates from a corresponding expected value in a deterministic outcome.

13. The network component of claim 8, wherein about 50 percent of all the possible outcomes are deterministic.

14. A method comprising:
receiving a plurality of internal timing references in a repeater node that forwards a timing reference along a distribution path;
storing a plurality of expected values that correspond with the internal timing references;
comparing the internal timing references to the expected values that correspond with the plurality of internal timing references;
determining whether any of the internal timing references substantially deviate from the corresponding stored values;
calculating an offset value if any of the received internal timing references substantially deviates from the expected values that correspond with the internal timing references based on the amount of deviation; and
adding the offset value to the timing reference that is forwarded by the repeater node to compensate for added noise in the timing reference.

15. The method of claim 14, wherein one of the internal timing references is received from a frequency domain adaptation function and comprises Gaussian noise that is added during transitioning from an ingress frequency domain to a system Phase-Locked-Loop (PLL) frequency domain.

16. The method of claim 14, wherein one of the internal timing references is received from a system Phase-Locked-Loop (PLL) function and comprises Gaussian noise that is added due to an intrinsic built-in response latency to changes in an input timing reference for the system PLL function.

17. The method of claim 14, wherein one of the internal timing references is received from an output PLL function and comprises Gaussian noise that is added due to an intrinsic built-in response latency to changes in an input timing reference for the system PLL function.

18. The method of claim 14, wherein the timing reference that comprises the added offset value meets the American National Standards Institute (ANSI) standard Stratum II level quality clock.

19. The method of claim 14 further comprising determining whether the substantially deviation generates a deterministic outcome, wherein a deterministic outcome exists when no more than one of the internal timing references substantially deviate from the corresponding stored values, and wherein the offset value is proportional to the amount of deviation between any of the received internal timing references and the expected values that correspond with the internal timing references.

\* \* \* \* \*